United States Patent [19]

Brauer

[11] 4,324,977
[45] Apr. 13, 1982

[54] SYNTHESIZED TARGET SYSTEM

[76] Inventor: Malcolm M. Brauer, 3830 Tanglefoot Ct., Bettendorf, Scott County, Iowa 52722

[21] Appl. No.: 225,568

[22] Filed: Jan. 16, 1981

Related U.S. Application Data

[63] Continuation-in-part of Ser. No. 18,534, Mar. 8, 1979, abandoned.

[51] Int. Cl.³ .............................................. G01V 9/04
[52] U.S. Cl. ................................. 250/222 R; 340/557
[58] Field of Search ............... 250/221, 222, 209, 578; 340/555, 556, 557; 324/178

[56] References Cited

U.S. PATENT DOCUMENTS

| | | | |
|---|---|---|---|
| 3,047,723 | 7/1962 | Knapp | 250/222 R |
| 3,475,029 | 10/1969 | Hyman | 250/222 R |
| 3,624,401 | 11/1971 | Stoller | 250/222 R |
| 3,727,069 | 4/1973 | Crittenden et al. | 250/209 |
| 3,807,858 | 4/1974 | Finch | 250/222 R |

Primary Examiner—David C. Nelms
Attorney, Agent, or Firm—Nathan Edelberg; Robert P. Gibson; Max Yarmovsky

[57] ABSTRACT

A synthesized target system utilizes emitters in the microwave or laser frequency for generating an electromagnetic energy curtain. Detectors are operatively disposed for detecting reflections within the energy curtain caused by penetrations of the curtain by one or more projectiles. A monitor is connected to the output of the detectors, and a recorder is used for storing the data output of the monitor. The event of passage of projectiles through the energy curtain, and their location upon penetration thereof, is monitored, scored, recorded and can be printed out, in hard-copy form, in real time. Physical targets and down-range human intervention therewith are eliminated.

10 Claims, 11 Drawing Figures

SYNTHESIZED TARGET SYSTEM

GOVERNMENTAL INTEREST

The invention described herein may be manufactured, used and licensed by or for the Government for governmental purposes without the payment to me of any royalty thereon.

This application is a continuation-in-part of a prior application, Ser. No. 018,534, filed Mar. 8, 1979, now abandoned, of Malcolm M. Brauer for A Synthesized Target System.

BACKGROUND OF THE INVENTION

Various means were used in the prior art to generate a target system which could evaluate the performance of new shooters, weapons and/or ammunition. The problem with prior art systems was that they frequently required targets of large physical size which were expensive to make, install, remove and store. The prior art systems lacked the ability to easily determine ballistic accuracy, shot dispersion, and controllability of the weapon system being tested.

In the past once a physical target was used very little remained, which could be reused inasmuch as the support structure thereof, often including telephone poles, was typically destroyed.

Another problem with prior art system is that large physical targets require special material handling equipment to build, erect and remove. In addition, valuable time is consumed in the scoring, recording and storage of test results. Also, considerable time and equipment is used in the repair and/or replacement of targets between the firing by successive groups of shooters and of various weapons and/or particular lot numbers of ammunition.

When smaller targets were used, in an attempt to conceal the physical target from gunner until a specific instant in time, the cost of raising/lowering or rotating the target was considerable and the eventual destruction of the target and its support was likewise nonproductive. These concealment means are unnecessary with and are eliminated by the synthesized target system (STS).

Prior art photographic means are likewise tedious, time consuming and do not provide immediate results in identifying projectile trajectory information. The present invention provides real-time, objective data at much less cost in capital equipment, and in personnel time used in data reduction.

Another problem with physical targets relates to the inability to photograph a projectile's flight trajectory in the proximity of physical targets due to obscuration. This problem relates to the impossibility of attempting to photograph the round, or rounds, continuously on the axis of the trajectory from a "safe" distance downrange. Prior art systems use a multiplicity of cameras, requiring extreme care in synchronization, and the use of many feet of film in redundant coverage from uprange, ahead of the physical target locations, and augmented by additional camera coverage down range after the physical target, in order to capture post-target break through of the projectile.

The prior art is represented by such patents as U.S. Pat. No. 3,025,406 (1962) to Stewart et. al. entitled, Light Screen for Ballistic Uses. The invention of Stewart serves merely to identify the passage of a projectile through a light curtain. In contrast, the present synthesized target system simultaneously detects and can record the position of projectiles within a target plane and can determine the order in which simultaneous groups of rounds penetrate the target plane, and even can detect and record their order and orientation during penetration. Also, it is noted that two closed-form complete frames or planes are required for operation of the Stewart system, while only one corner of a frame or target plane is required in the present invention.

Other prior art of interest includes U.S. Pat. No. 3,846,026 (1974) to Waters, entitled Rotating Beam Surveying Method and Apparatus; U.S. Pat. No. 3,603,691 (1971) to Hamilton, entitled Laser Control for Automatic Alignment of Structures; and U.S. Pat. No. 3,617,134 (1971) to Frush, entitled Optical Image Frame Coordinate Data Determining System.

The present invention may be viewed as a response to a long felt need for a system which can compare the performance of personnel, weapons, and/or projectiles, having varying characteristics, individually or in combination, and under varying environmental conditions.

SUMMARY OF THE INVENTION

The present invention relates to a synthesized target system comprising, a plurality of emitter means, for generating along X and Y axes, an electromagnetic energy curtain; detector means for detecting reflections from projectiles passing through the energy curtain, real time monitoring means connected to the output of said detector means; and recording means for generating immediate, archival records for storing the data output of said detector means. The event of passage of a projectile, or groups of projectiles, through the energy curtain, and their location and orientation upon penetration thereof, may be monitored by supervisory personnel, and given as immediate feedback to the shooter and recorded for immediate or later comparison.

The present invention facilitates an instantaneous feedback of objective targeting and/or projectile trajectory results to the test range officer and/or other designated personnel or locations, which may include the shooter or gun crew, without subjective degradation of otherwise significant loss of either material or time. Also, the present system eliminates the need, and therein alleviates a safety problem, for personnel to go to/from the down-range "impact" area to perform lowering/raising or rotating and scoring, taping and targetchange activities on this or adjacent ranges.

The present invention facilitates increased ballistic realism by reducing the usual turbulence effects in the vicinity of hard physical targets. With the present system these turbulence effects do not have an opportunity to peculiarly modify the round-to-round trajectories, causing unreconcilable repeatability errors. Furthermore, because no "fabric" element is used for a physical surface with the present invention, once "erected", the system will be more usable and less sensitive to environmental effects, such as wind, hail, rain, etc., and safe without deterioration between and during demonstration, test or training missions.

Since the present system does not employ a physical target plane, but an energy curtain that is activated only upon penetration, the system will last indefinitely and can be easily and inexpensively stored. For example, the emitter/detector rails employed therein, although separable, are sufficiently sturdy for simple transport and, therefore, facilitate use at remote demonstration, test and training locations, while being easily stacked, bundled and stored when separated.

The rails, more fully described hereinafter, protect the emitters and the detectors from projectile damage while the other electronic elements are protected by ballistic cases that are positioned out of the line of fire. Life expectancy is determined by the basic reliability and maintainability of the hardware itself and is not a function of the environment, as is the situation with prior art physical targets.

The present invention facilitates use of x-axis components for the simpler tracking function, where a means is needed to log the general trajectory of a projectile, or group of projectiles, as it moves down-range, but where the precise x-y address is not required. The present device may be used, in part, to eliminate the tedious photographic-type of recording currently employed to observe general projectile delivery, with its extensive dark-room and data-reduction cost and delay. All of the single-axis recording means would be employed using STS with its inherent spurious-noise rejection capability.

An additional application of the present system relates to certain targeting problems in which it is necessary to identify the disposition of rounds which do not impact within an expected target area such as with a miss-distance indicator (MDI). By enclosing the expected target area with a STS, such MDI data are provided. Hence, said problem is further reduced by the present invention.

In view of the above, it is an object of the present invention to provide a system for synthesizing targets which will eliminate the need for use of actual physical targets used in the demonstration, testing and training of personnel with new weapons, and/or ammunition.

Another object is to provide a target synthesizing system which will reduce and/or simplify target systems handling, e.g., reduce and/or simplify erection, use, transportation, removal, and storage.

Another object is to provide a targeting system which will afford greater system safety than that of prior art, e.g., for supervision, gun crews, and equipment.

Another object is to provide a target system which can operate with the use of fewer personnel.

Another object is to provide a system which will identify disposition of rounds which do not impact within an expected target area, as with an MDI.

Another object is to provide a system which will react faster, with greater accuracy and repeatability in varying atmospheric situations than is currently possible with existing forms of physical targets, without imposing many inherent error terms which are hard to measure due to their rapid state of flux such as local turbulence effects in the immediate vicinity of the prior art physical targets.

Another is to provide a system that will immediately characterize groups of rounds fired in rapid succession such that round-to-round accuracy and dispersion can be monitored and recorded in real time, without subjective human interpretation, and without dependence upon round-to-round proximity or orientation.

Another object of the system is to provide data to enable differentiation between prepared rounds as to the sequence they were fired.

Another object is to provide for system sensitivity which allows a tumbling round to pass through the target plane, without effecting the recorded results of adjacent or simultaneous rounds.

A further object of this invention is to eliminate dependence upon assessing holes in a physical target. With the present STS, each penetration of the energy matrix is a discreet instantaneous action, not depending upon any prior or subsequent round's position in the matrix or temporal pattern, and there is not any hole within which one round may "obscure" another round.

For a better understanding of the present invention, together with other and further objects thereof, reference is made to the following descriptions taken in connection with the accompanying drawings.

DESCRIPTION OF THE PREFERRED EMBODIMENTS

The present invention utilizes a vertically disposed electromagnetic energy curtain through which a projectile or plurality of projectiles are permitted to pass. The energy curtain is divided horizontally and vertically into a specific grid pattern such that only X and Y detectors, that are excited by the reflected energy from the projectile passing through the energy curtain, at a given instant and location will induce a real time recordable event in the detection system.

Figure 1:
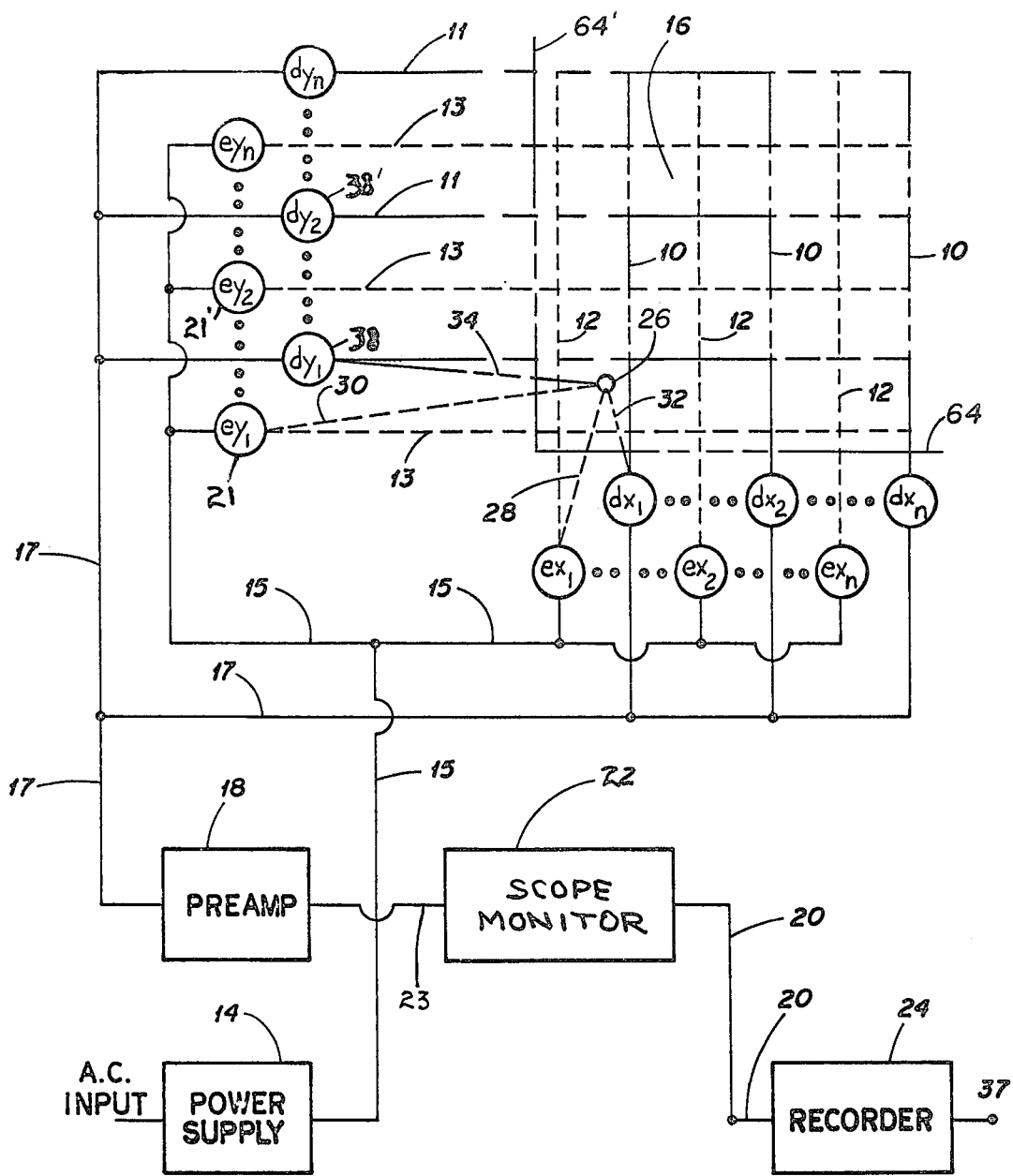
FIG. 1 is a block diagrammatic view of the present inventive concept.

A representation of the energy matrix or grid is shown in FIG. 1. The axis emitters are designated by "$e_x$" and the Y-axis emitters by "$e_y$" respectively, while the X-axis detectors are designated by "$d_x$" and the Y-axis detectors by "$d_y$" respectively. Thus, there are in effect two coexisting grid arrangements, a detector grid, 10 and 11, and an emitter grid, 12 and 13, consisting of X and Y addresses respectively, which are both superimposed upon each other in a synthesized target plane 16.

A power supply 14 energizes the emitters $e_{xn}$ and $e_{yn}$ when the system is activated. Although the power supply 14 is shown in FIG. 1 to be connected to an ac power source, one may use solar cells or a portable battery (dc) input for this power supply. The output from the power supply 14, depending upon what type of energy curtain is used, is fed via a conductor 15 into each of the elements 21, $e_{x1}$–$e_{xn}$ and $e_{y1}$–$e_{yn}$ in order to create the afore-described energy curtain in the form of a grid pattern 16 along X-Y coordinate axes. It is understood that conductor 15 may typically include a coaxial cable, optical elements, light-pipe, or a wave guide as necessary.

With reference to the detection grid, each individual detector output 17 is preamplified in individual preamplifier stage 18. In FIG. 1, all detector outputs are shown for simplicity, fed into a common preamp 18. In the actual embodiment each detector has its own preamp. Each preamp output is then fed via conductor 23 into its own channel of an electronic switch or similar type triggering means well known in the art and is included within scope monitor 22. Thus, each signal path is maintained as a separate circuit. The output of scope monitor 22 is then fed via electrical conductor 20 into a recorder 24, an X-Y plotter, or similar archival recording means. The recorder 24 has a real time output 37.

Figure 2:
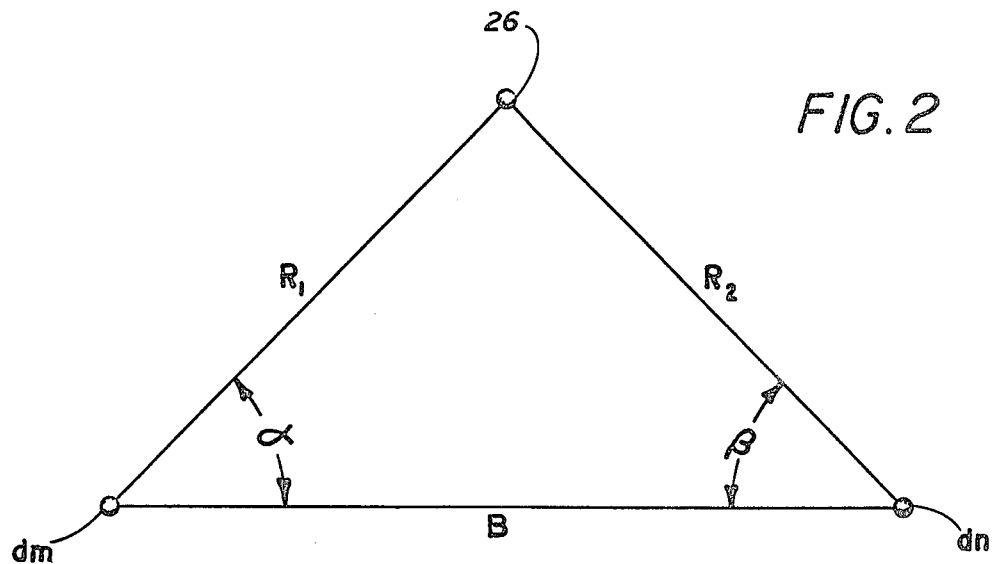
FIG. 2 is a schematic view showing the trigonometry employed in the present system.

The basic trigonometry employed by the system, in order to determine the address of a particular projectile's penetration of the energy curtain 16, is illustrated in FIG. 2. By simply recording one set of the indicated combinations of coordinates, the X-Y address of a given projectile may be determined and then compared with similar data for any other round, or burst of rounds.

The applicable combination of coordinates in FIG. 2 are any of the following:

1. $R_1$, $R_2$, B
2. $R_1$, $\alpha$, B
3. $R_2$, $\beta$, B
4. $\alpha$, $\beta$ and B This sytem permits a recently completed recordation of coordinates to be compared with prior records or print-outs as a baseline for qualification purposes. Growth potential exists in the current embodiment in that the monitor 22, shown in FIG. 1, may be a digital display unit that is connected via radio link or hardwired to a central computer, not shown, thus providing the input/output means for entering new results or calling up old records for in-field comparison on an objective basis. This capability can provide in-field, on-tube overlays, on the monitor 22 or hard-copy printout by the recorder 24 of the prior data for digital comparison with the aforementioned new results, not dependent upon the number of rounds fired and effective on single-shots as well as barrages.

For calibration purposes in the laboratory, rotating mirrors or a spinning dummy-round 26, may be inserted at any or all grid positions. These calibration means may be located as shown in FIGS. 1 and 2 to simulate a real projectile and to return the emitted beams 28 and 30, as shown in FIG. 1, to the detectors $d_{x1}$ and $d_{y1}$ via reflected beams 32 and 34.

As shown in FIG. 2, a minimum of two detectors $d_m$ and $d_n$, one each in the X and Y plane, are required to obtain an appropriate combination of data which will enable positional location of the projectiles passing though the energy curtain 16.

Figure 3A:
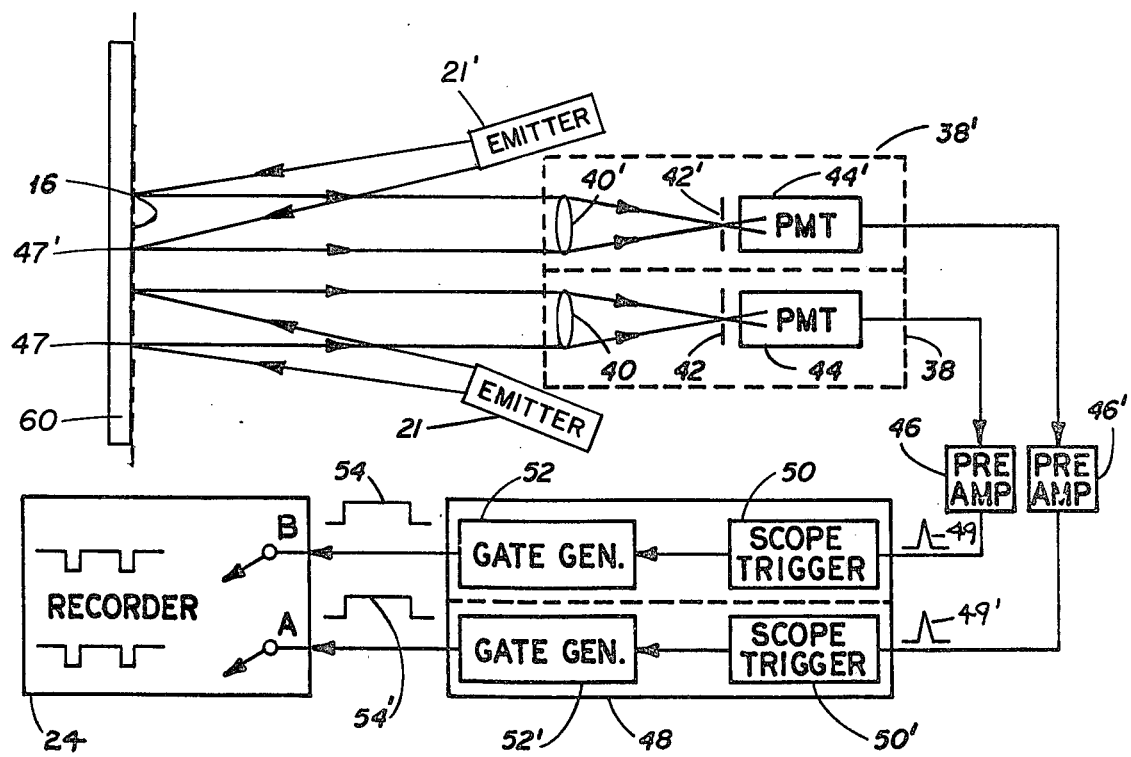
FIG. 3A is a schematic view of a test set-up of two adjacent emitters and detectors of the present system.

FIG. 3A shows a method for field calibration of mutually orthogonal or adjacent (overlap) detector pairs 38, 38' at points of intersection 47 and 47' respectively in the target plane. In this instance, point sources of light, such as emitted by microscope illuminators, not shown, temporarily replace the photomultipliers 44, 44' so that the emitted light is axially aligned with the path previously sensed by the PMT's. This enables simple, safe, visible-light calibration and also requires the temporary erection of a narrow physical, reflective target plane material 60. Temporary reflector 60 may be positioned perpendicular to the X-axis detectors and after calibration moved perpendicular to the Y-axis detectors for the procedure to be repeated. Target material 60 should be of a material that is both microwave and white-light reflective. Normally, as intended by this embodiment, white-light will be used to also calibrate the microwave system as discussed above. By this means, the light projected by emitter 21 and the light from the aforementioned point source of light is made to coincide, and has its own discrete address. FIG. 3A shows a plurality of energy sources 21, 21', which are intended to illustrate schematically adjacent emitters on the same axis or rails to be described hereinafter in further detail. After calibration is complete the point sources of light are replaced by PMT detectors 38 and the calibration target 60 is removed.

Still referring to FIG. 3A, detectors 38, 38' contain two acromatic lenses 40 and 40' having axially aligned apertures 42 and 42' and photomultipliers 44, 44' operatively respectively positioned proximate thereto. Each acromatic lens 40, 40 may comprise two plano-convex elements, not shown, to focus reflected light on the photomultipliers 44, 44' and has a preferred focal length of 390 mm and a diameter of 54 mm. Each photomultiplier tube 44 and 44' may be an RCA photomultiplier model 5816 or equivalent. A PMT power supply capable of supplying power to photomulitpliers 44, 44' is omitted in the FIG. 3A for clarity and should be rated for 1000 volts DC at 5 milliamps. Also included within the 38, 38' detectors, but not shown, are certain support housings which are well known in the art. The output of each PMT 44, 44' is fed into preamplifiers 46 and 46' respectively. A preamplifier having a response range of between 100 Hertz and 40 kilohertz, and a decibel response of $+/-2$ dB with a 17 to 20 dB gain and a one volt maximum output, is appropriate for interface with the detectors 38 and 38'.

Preamp output pulses 49, 49' are fed into an oscilloscope 48, having separate scope trigger inputs 50, 50'. The oscilloscope is used as a projectile hit discriminator. A techntronics type 555 dualbeam oscilloscope having type-D plug-in units or the equivalent thereof, may be used. It is noted that the oscilloscope which is utilized must include therein pulse gate generators 52, 52' to provide two gate output pulses 54 and 54' capable of driving a hard-copy recorder 24 described below. The visual output from the oscilloscope may be used by a knowledgeable range officer to monitor performance. A "memory" type oscilloscope is useful to improve visibility.

By having individual channels associated with detectors, 38, 38' the location of simultaneous rounds penetrating the synthesized target plane can be identified by this sytem. Further, coding rounds by coloring them in advance of their being fired is a means for identification between rounds. Thus, if projectiles are not temporally spaced with sufficient separation to allow electronic discrimination on that basis alone, reflective-index discrimination can be provided. Also, this technique will enable detection of rounds that penetrate the target in an order other than as fired. By circuitry well known in the-art, address-identification is facilitated for simultaneous rounds, or bursts of rounds which result from tumbling or other anomalies that occur with experimental projectiles and/or weapon systems in severe environments.

When a pemanent copy is required of the projectile address in the target the electronic output of the oscilloscope gate generators 54 and 54' are fed into a graphic chart recorder of X-Y plotter 24 for real-time, hardcopy printout facilitating immediate graphical evaluation and comparison and/or archival storage through an appropriate data recording means. Non-graphic, purely digital recording devices may be used for storage functions when space limitations are of concern.

Figure 3B:
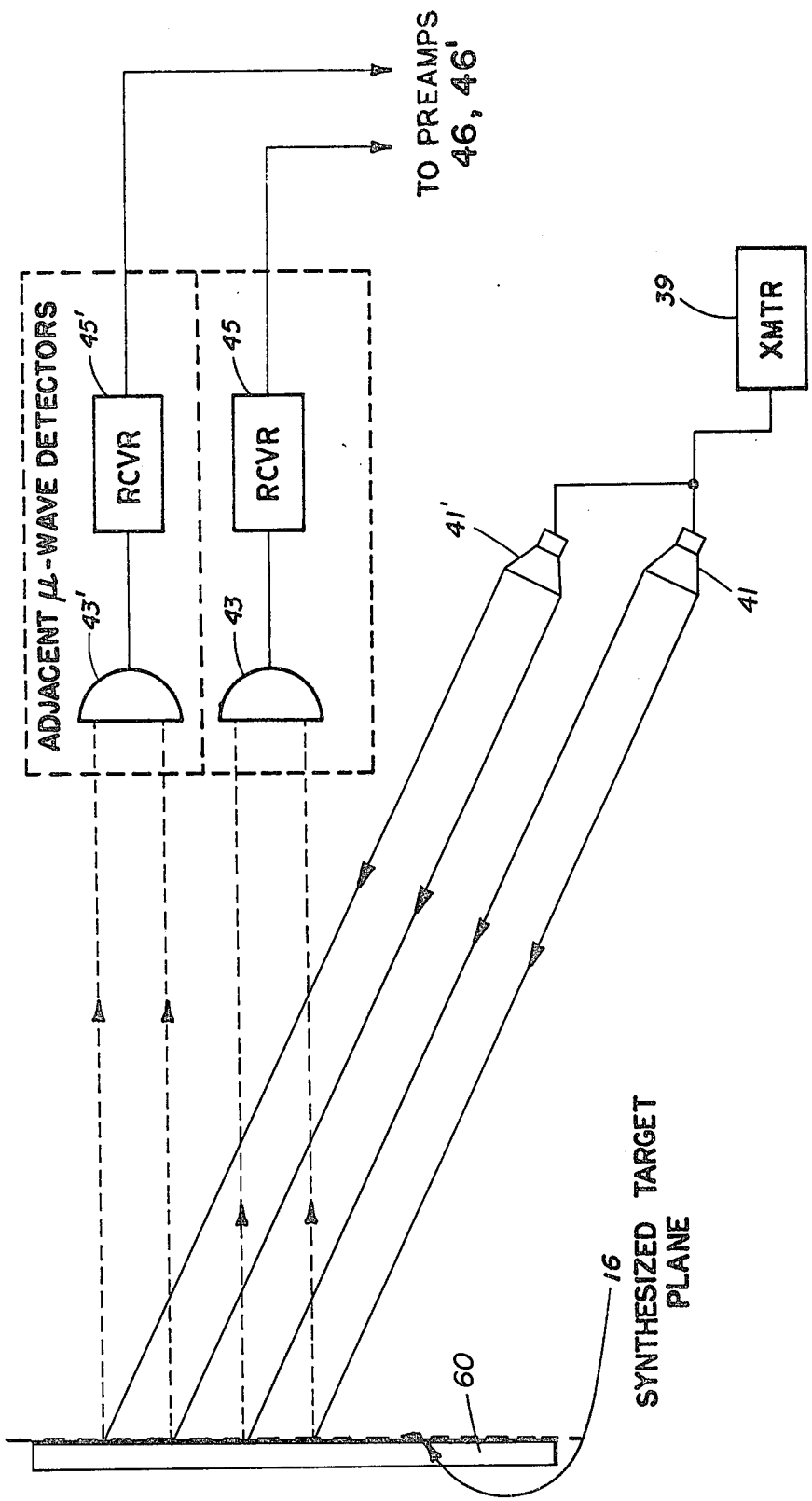
FIG. 3B is a schematic view of a typical microwave variation possible with the test set-up shown in FIG. 3A.

An alternate embodiment, shown in FIG. 3B, describes a system similiar to that shown in FIG. 3A, but utilizes microwave energy instead of light energy. A microwave transmitter 39 is electrically connected to antennas 41 and 41' which create a synthesized target plane 16. An appropriately matched plurality of receiving antennas 43 and 43' convey the reflected microwave beams to electrically coupled microwave receivers 45 and 45'. It is to be understood that the reflected signals, are kept separated. Various components of the receivers 45, 45' could be shared, as is known within the state of the art, as by multiplexing, such that complete receivers are not required for each channel. The signal output from the receivers 45, 45' is then electrically connected to the preamplifiers 46, 46' and completing circuitry, aforedescribed FIG. 3A. As noted above, the microwave elements may be temporarily replaced with visible-light elements for calibration purposes using a temporary reflector, 60.

Figure 4:
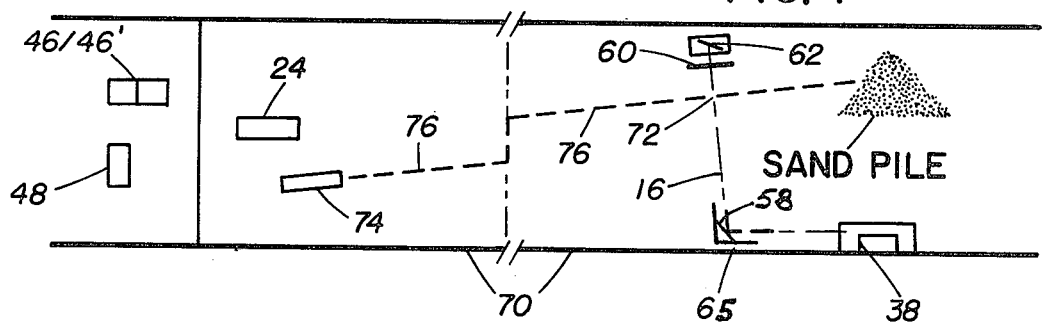
FIG. 4 is a schematic view of a test equipment layout used to demonstrate the present system.

FIG. 4 shows an indoor test range layout 70 used to demonstrate the present system. Two sets of mirrors are used for the indoor range. A first mirror 58 is optically positioned on L-beam 65 between detectors 38, 38' and target plane 16 in order to "turn the corner" by 90°. Mirror 58 is a 12.5 cm×12.5 cm first surface mirror, flat to $\frac{1}{4}$ λ in an adjustable mount. The second mirror 62 is mounted on the far side of the target plane 16, and is positioned to deflect background noise and random reflections off interior wall 71 from entering the target plane 16. A third mirror, not shown, is located to deflect random and background noise that would otherwise enter into the target plane from the ceiling.

In FIG. 4, emitters 21 are not shown for purpose of clarity but are described hereinafter in more detail in discussion of FIG. 5. The emitter and detector components are operatively electrically connected as shown in FIG. 1. At an appropriate downrange target-impact point 72, the Y-axis rail 65 is oriented with respect to weapon 74 line of fire 76, so that target plane 16 is perpendicular to the line of fire 76. In the indoor test range environment, an X-axis rail, not shown, is positioned horizontally, that is, along the ground, its support does not present a problem. The X-axis rail stability is such that, when coupled to the Y-axis rail 65, it provides requisite support to the latter. In the field application, the rails can be camouflaged in order to avoid or reduce any view of them by gunnery personnel.

Emitters 21, not shown in FIG. 4, are electrically connected to an appropriate power source 14 as above noted. Mirror 58 is used as a corner reflector to simplify the installation and simultaneously "fold" the energy path so that the equipment fits within the indoor existing range. This technique may be used for the emitter energy train between emitter 21 and the energy curtain 16 as well. In operation, projectile reflections occurring in the energy curtain cause detectors 38 and 38' to generate an output which is fed to the amplifiers 46, 46', whose outputs are then fed to the completing circuiting aforedescribed. The electrical interconnections between components were omitted in this Figure for simplicity and clarity and were previously described in FIG. 1.

In order to establish an aiming point within the synthesized target plane, energy curtain, a stake, not shown, may be mounted directly behind or to either side of the target plane. For gunnery exercises, where a permanent aiming point is required, such aiming point, in certain cases, will actually be located outside, to the left, right, above, or even below the actual hit area or target plane. Therein, the aiming point need not be destroyed by the gunnery mission. Accordingly, it should be noted that the aiming point may comprise a projected image, as may appear in an optical sight, as opposed to an actual, physical aiming point.

In operation, referring once again to FIGS. 1-3A, mutually perpendicular groups of emitters 21 create a narrow curtain of energy or target plane 16. In systems where a high degree of precision is required, the emitters will provide energy that is more highly collimated or coherent (laser, typically) in order to further reduce the potential for error from ambient or stray energy reflections and data resultant therefrom. When a bullet or projectile passes through the target plane 16, it will reflect emitter-released energy back in the direction of the detectors 38. Because the target plane 16 is divided horizontally and vertically into a specific detector grid pattern, the only X-and Y-coordinate detectors excited will be those impinged upon by the reflected energy from the bullet or projectile that passes through the target plane at a given instant in time. The sequence will be the same in the event that groups or bursts of rounds or projectiles penetrate the STS target plane 16 even if some are delayed and/or tumbling upon entry.

Figure 5:
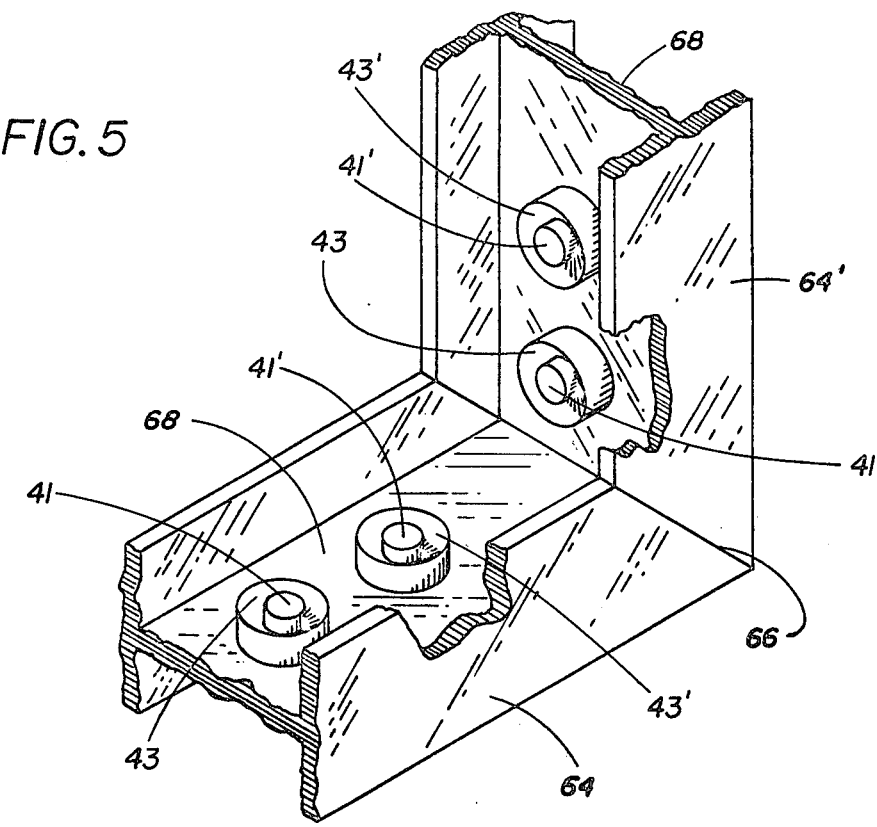
FIG. 5 is a fragmentary, isometric view of a portion of the X-and Y-axis rails of the system.

FIG. 5 illustrates the use of X and Y axis optical rails 64 and 64' respectively. Rails 64 and 64' have an I-beam cross-sectional configuration wherein web section 68 supports coaxially configured microwave type emitters 41, 41' and receiving antenna 43, 43'. A quick-disconnect joint 66 is employed on one end of each rail in order to achieve easy and accurate connection between the two rails.

Figure 6:
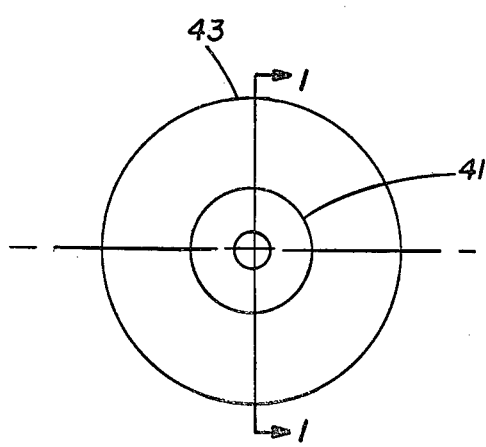
FIG. 6 is an enlarged plan view of a typical coaxial emitter/detector to be employed in the present invention.
Figure 7:
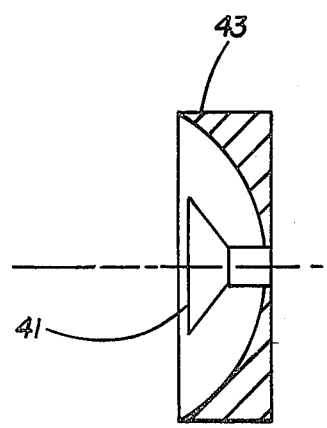
FIG. 7 is a cross-sectional view taken along line 1—1 of FIG. 7.

FIGS. 6 and 7 show the structural relationship of the emitter elements 41, 41' and the receiving antenna 43, 43' in enlarged view and in additional detail. In this specific embodiment, detector 43 is annularly disposed about the axially aligned emitter element 41. A concave, circularly shaped detecting receiver antenna 43 is used in this instance in order to provide sufficient collector surface.

Figure 8A:
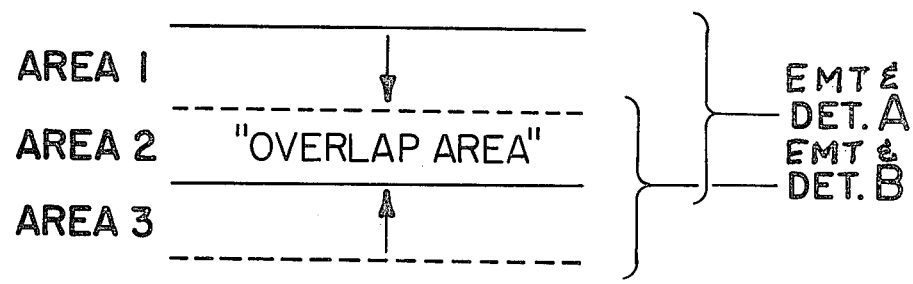
FIG. 8A is a diagrammatic illustration of the detection and overlap areas of two adjacent detectors.

Emitters 21, 21' and Detectors 38, 38' are configured and positioned on support rails 64, 64' so their respective illuminated or sensing areas slightly overlap, as shown in FIG. 8A. A projectile, traveling normal to the target plane 16 may excite a plurality of detectors depending upon its size and whether it is tumbling or not. Projectile, emitter, and detector overlap relationship is shown in FIG. 8A. It may be assumed that Emitters A and B and Detectors A and B overlap slightly Area #2. Assuming that a projectile is of small size, e.g., 4.32 mm, and penetrates a target plane in precisely the location at which Detectors A and B ovelap, it can be seen that such a projectile will cause a reflection that will trigger both of the detectors sharing the overlap area. The above condition may occur within either the X-axis, the Y-axis, or both simultaneously, the latter event normally triggering a maximum of four detectors at the same instant, for a given projectile.

Figure 8B:
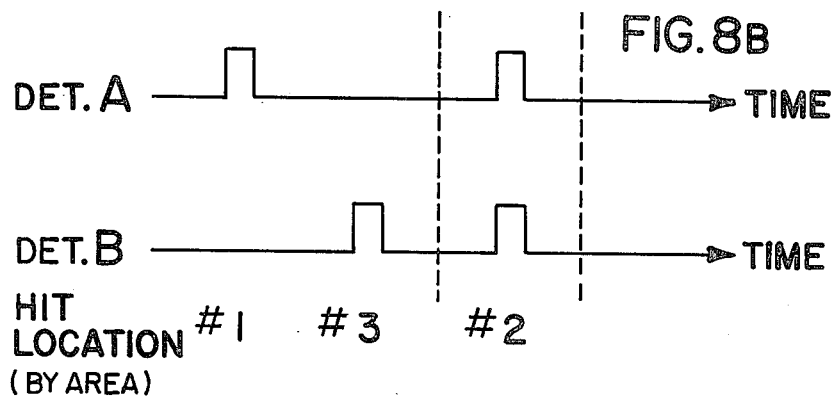
FIG. 8B is an illustration of a typical data printout following three target events, the last of which is in an overlap detection area.

FIG. 8B shows the readout from a recorder which corresponds to a penetration in the overlap area and is shown at hit location area #2. Hits not falling in an overlap area causing two adjacent detectors to be enabled would typically result in individual outputs as shown by hit locations 1 and/or 3. Hits occurring simultaneously exciting any combination of detectors would cause an output similar to hit location area No. 2, for those specific detectors, which may not be adjacent to each other.

Figure 8C:
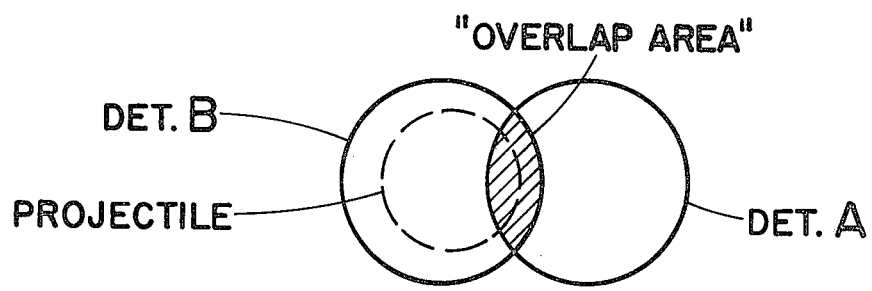
FIG. 8C illustrates how the volume of hit data relating to rounds that impinge into overlap detection areas may be reduced.

In certain instances, if a projectile is larger in diameter than an overlap area is in width, as illustrated by FIG. 8C, and if the sensitivity of the detectors is set appropriately, the STS can be made to overlook hits that impinge into the overlap area, thus merely exciting the detector having the greatest signal strength. Thus, the "overlap area" assures no "holes" in the detector pattern, while detector sensitivity adjustment can be used to "mark" a hit only in detector B, hit location #3 in FIG. 8B.

The upper and lower threshold for scope trigger 50, 50' and the duration threshold for gate generators 52, 52' are set in accordance with the characteristics of a particular round to be targeted. This enables accurate discrimination between a true hit and random noise, allowing the true hit to be "marked" as above noted and blocking the entry of random noise.

Detector overlap in the X and Y axes have not been illustrated in FIGS. 3A and 3B for the sake of clarity.

The precision of the present system will increase when detectors are made more sensitive to narrower slices of area within the target plane and their numbers are increased.

It is to be also noted that the emitter-detector configuration of FIGS. 5, 6 and 7 comprises an alternative to the arrangement used during the tests and shown in FIG. 4. However, the trigonometry of FIG. 2 would still pertain in the embodiment to the extent that the angles and distances between any X-Y detector pair arranged on the rails of FIG. 5 would be measurable.

While there has been described and illustrated specific embodiments of the invention, it will be obvious that various changes, modifications and additions can be made herein without departing from the field of the invention which should be limited only by the scope of the appended claims.

What is claimed is:

1. A synthesized target system comprising:
    a power supply means for providing electrical energy to said target system;
    overlapping emitter means for generating a target plane in the form of an electromagnetic energy curtain;
    overlapping zone detector means operatively disposed in said target plane for detecting reflections from a plurality of projectiles, for simultaneously detecting the positions of said projectiles within said target plane, for determining the order in which said projectiles penetrate said target plane, and for generating electrical output signals in response to said reflections;
    monitoring means electrically connected to said amplifying means for instaneously observing the position of said projectiles in said energy curtain which includes;
        trigger means for monitoring a separate output signal for each projectile reflection, for discriminating between said projectiles and background noise, and for blocking spurious signals; and
    pulse shaping means for broadening the width of said amplified detector output signals;
    recording means for generating real-time archival records for storage and retrieval of the data output of said pulse shaping means; and
    rails means for protecting and holding said emitter means and said detector means operatively disposed about said target plane which includes;
        a portable first optical rail member disposed along an x-axis of said target plane;
        a portable second optical rail member disposed along a y-axis of said target plane; and
        disconnect joint means for providing easy and accurate erection and optical alignment of said first and second portable rail members.

2. A synthesized target system as recited in claim 1 wherein said emitter means includes a plurality of emitter elements operatively disposed upon said first and second optical rail members.

3. A synthesized target system as recited in claim 2 wherein said detector means includes a plurality of detector elements operatively disposed upon said first and second optical rail members.

4. A synthesized target system as recited in claim 3 wherein said emitter means includes microwave transmitter means.

5. A synthesized target system as recited in claim 3 wherein said emitter means includes laser means for providing energy to said target plane which is more collimated or coherent and for reducing the potential error resulting from ambient or stray reflections entering said target plane.

6. A synthesized target system as recited in claim 5 wherein said microwave transmitter means includes;
    a plurality of mircowave emitters operatively disposed in said rail means for generating an energy curtain in microwave frequency; and
    a plurality of concave circularly shaped microwave receiving antenna, each annularly disposed and axially aligned with smicrowave emitters.

7. A synthesized target system as recited in claim 3 wherein said monitoring means includes an oscilloscope electrically coupled to the output of said pulse shaping means.

8. A synthesized target system as recited in claim 7 wherein said detector means includes a preamplifier electrically coupled to the o of said detector means.

9. A synthesized target system as recited in claim 8 wherein said oscilloscope includes;
    a pulse triggering network; and
    gate means for pulse shaping output signal of said pulse triggering network.

10. A synthesized target system as recited in claim 4 wherein said detector means includes microwave detector means.

* * * * *